June 16, 1964  C. E. MAYNARD  3,137,038
APPARATUS FOR MOLDING THERMOSETTING MATERIALS
Filed March 8, 1961  8 Sheets-Sheet 3

INVENTOR.
Charles Edgar Maynard
BY Chapin + Neal
Attorneys

June 16, 1964 C. E. MAYNARD 3,137,038
APPARATUS FOR MOLDING THERMOSETTING MATERIALS
Filed March 8, 1961 8 Sheets-Sheet 4

June 16, 1964

C. E. MAYNARD 3,137,038

APPARATUS FOR MOLDING THERMOSETTING MATERIALS

Filed March 8, 1961

INVENTOR
Charles Edgar Maynard
BY Chapin + Neal
Attorneys

June 16, 1964   C. E. MAYNARD   3,137,038
APPARATUS FOR MOLDING THERMOSETTING MATERIALS
Filed March 8, 1961   8 Sheets-Sheet 7

3,137,038
APPARATUS FOR MOLDING THERMOSETTING
MATERIALS
Charles Edgar Maynard, Florence, Mass., assignor, by mesne assignments, to The Standard Oil Company, Cleveland, Ohio, a corporation of Ohio
Filed Mar. 8, 1961, Ser. No. 94,389
8 Claims. (Cl. 18—30)

This invention relates to an apparatus for molding thermosetting materials.

This is a continuation-in-part of my copending application Serial No. 758,264, filed September 2, 1958, now abandoned.

The principal objects of the invention are to provide means which take advantage of the various properties of the molding material as it is transformed from a substantially stable granular powder to a plastic flowable mass and finally to an irreversible cured condition, in the shape of the desired article, and further to accomplish this transformation in a manner such that the conversion takes place as a continuous procedure which is subject to constant control, and in a manner permitting automatic operation.

As later more fully pointed out these objects of the invention are achieved in part by a novel concept of the relationship of the curing reaction with the increasing plasticity of the material through final cure in the mold cavity, which gives desired form or shape to the article.

Further objects and advantages of the invention reside in the handling of the material to provide a product of improved and uniform quality, more efficient use of equipment and material and substantial economies in production costs and maintenance.

A further and related object is to make possible the use of more highly catalyzed and otherwise improved thermosetting molding compounds, incapable of use by present methods and machines.

These and other objects and advantages will be made apparent in the accompanying drawings and in the following specification and claims.

For a full and proper understanding of the invention it is necessary to consider briefly certain conventional procedures from which those of the present invention depart and the novel concepts upon which those departures are based and by which the general and specific objects of the invention are obtained.

One problem in any molding operation is getting the molding material into the mold. Bearing in mind the obvious necessity of getting the finished article out of the mold, molds are made in two or more parts, the parts being separated to permit the ejection of the cured article. In one usual mold charging procedure, a suitable quantity of molding compound is placed in the open mold and the mold closed to compress the charge, the mold being heated to effect the cure. While in some procedures the powder charge is placed directly in the mold in powder form, this procedure has been found generally unsatisfactory.

Usually the powder charge is first cold pressed into a block or cake, commonly called a "preform." The main purpose of preforming the charge is to increase its bulk density, thereby improving the heat conductivity of the charge, and facilitating its handling. Prior to being placed in the mold, the preforms are heated, usually by high frequency heating. The preheating of the preform is to advance it, in some degree, toward its plastic state and somewhat advance the curing reaction before the cake is placed in the mold to shorten the time of the molding cycle. Following the insertion of the heated preform in the mold, the mold is closed and maintained at curing temperature. During molding, the mold must usually be opened to allow gases and vapors to escape and then closed to complete the cure. This procedure, known as "breathing the mold," prevents the entrapment of gases in the resin.

In so-called top ram molding the preheated preform is placed in a so-called pot communicating with the mold cavity through an opening in the top mold member. The charge is transferred to the mold cavity, after the mold has been closed through the opening by the ram working in the pot.

In all of these prior art procedures no effort is made, or is possible, to provide continuity of the conversion of the molding material to molded form, nor is a nice control of the molding and curing condition possible, nor is there any recognition of the desirability of uniformity of the molding and curing conditions or an understanding of what those conditions should be or the importance of continuity as such.

In all of the prior art procedures there is a wide variation in the condition of successive mold charges with respect to temperature plasticity, density and stage of cure at the time the charge is introduced into the mold.

Applicant has found that continuity of processing the charge from its unheated free-granular or powder form to its cured condition in the completely formed article, by means permitting an exact continuous control over the entire conversion not only results in better products of greater uniformity but makes possible substantial economies in material handling and permits automatic operation of the material processing as a whole providing a further and substantial reduction in manufacturing costs.

As commonly used in the molding art the term "cure" has reference to that cure of the resin which takes place after the material has been brought to shape in closed mold. However, some curing reaction occurs during the preparation of substantially all thermosetting compounds and in molding parlance the greater the extent of such pre-reaction the "harder" is the compound. In commercial practice such pre-reaction must be kept within "fool proof" limits. It is recognized that the hard compounds require the least curing time in the mold. However, hard resins are difficult to handle in ordinary molding procedures and conventional apparatus because of the critical skill required of the mold operator. Thus the full advantages of hard compounds have not been realized and precision in their preparation has not been attempted.

Basic to applicant's machines is the concept that the "cure" of a thermosetting plastic compound should be continuous from at least the first application to the compound of pressure and heat until the completion of the cure of the formed charge. In addition, the forming or molding of the charge in its relation to plasticity, flow properties and changes in density have a definite and important relation to the state of cure of the material and the quality and physical properties of the product—in other words "cure" and "shaping" of the compound should be carried on as an inseparable simultaneous procedure, and when so considered and carried out optimum conditions may be imposed throughout the transformation both as regards "cure" and "shaping."

Utilizing the above concept applicant's machines, enables a more precise relation of the pre-reaction of the compound and the cure in the mold, and the successful use of harder compounds where found advantageous.

Figure 1:
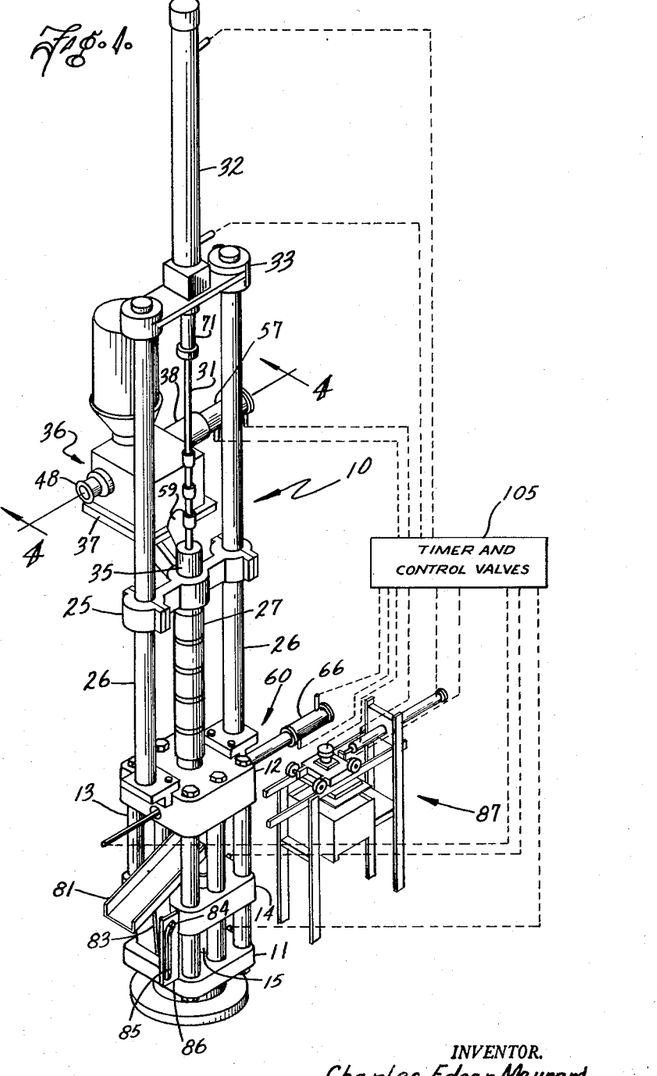
FIG. 1 is a generally perspective view of a mechanism for carrying out the method, and illustrating one structural embodiment of the invention.
Figure 2:
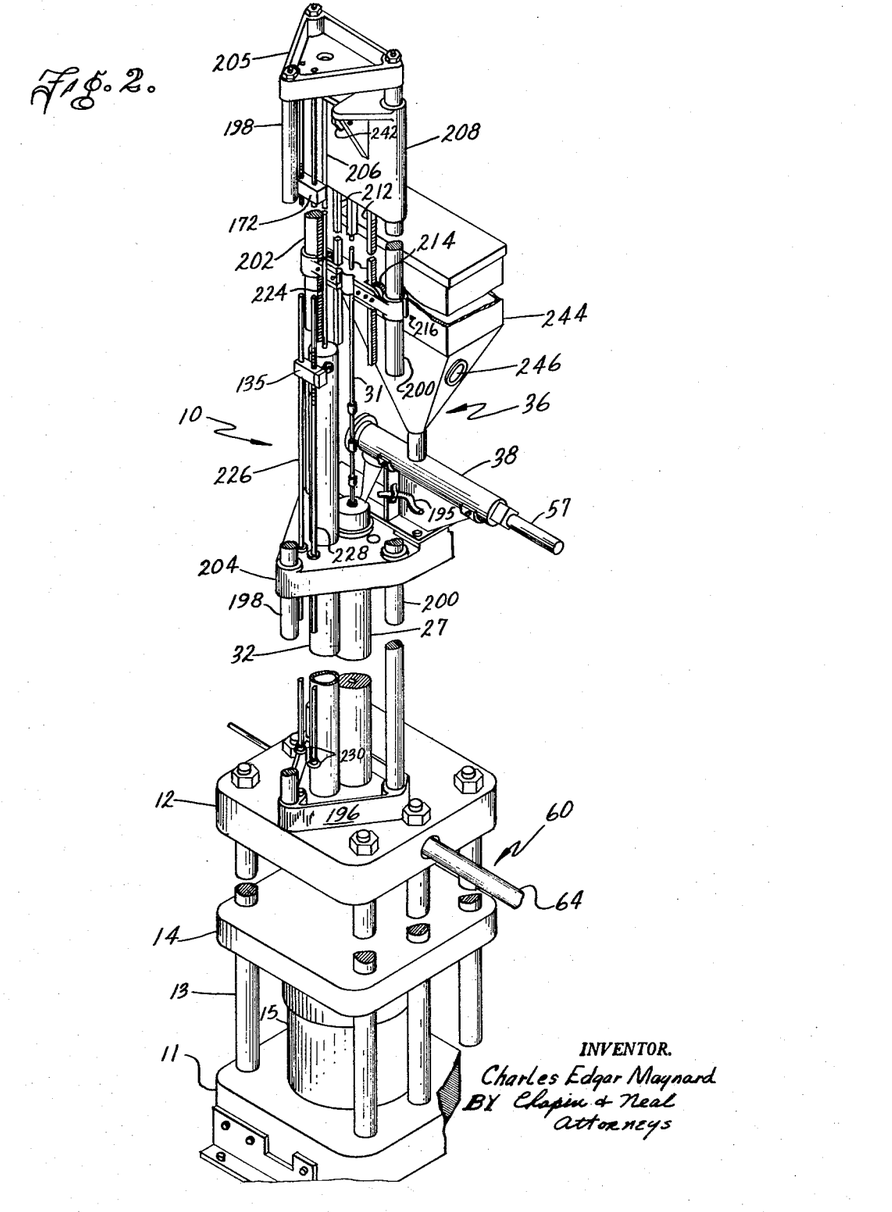
FIG. 2 is a perspective view showing an alternative structural embodiment of the invention.

Referring to the drawings in FIGS. 1 and 2 are shown alternative structural embodiments of the invention. Both embodiments achieve the desired objectives of the invention and have the same principles of operation and the same reference numerals are used to indicate like parts.

Figure 3:
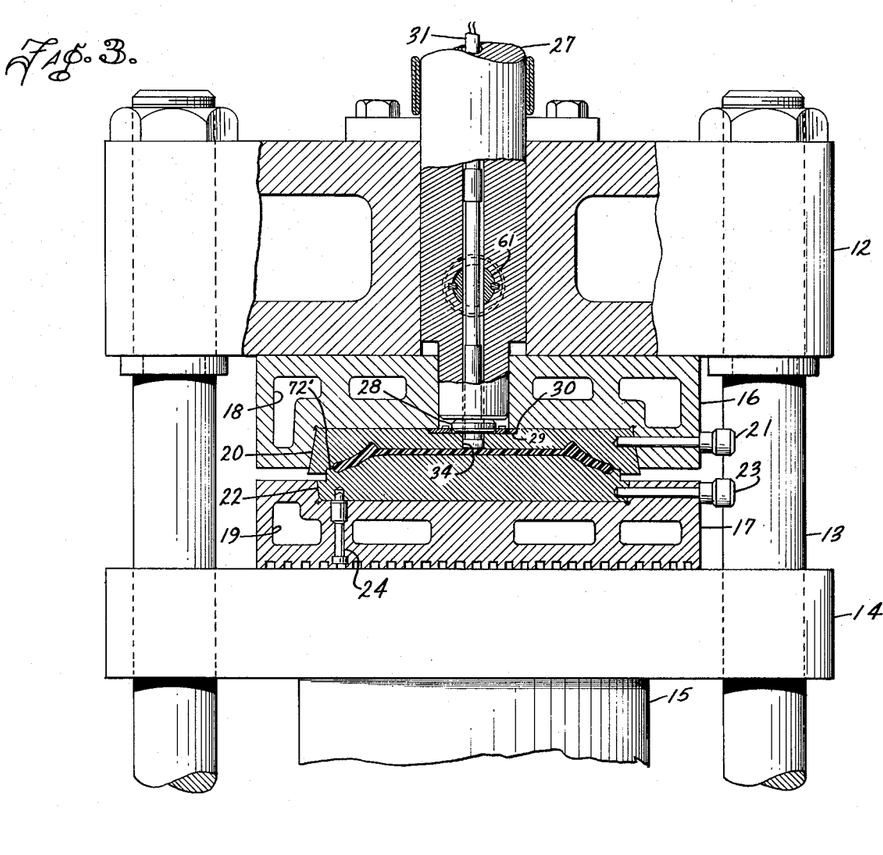
FIG. 3 is a detail sectional view, on a larger scale, showing the press and mold closed and the injection or transfer plunger at the end of its mold charging stroke.

The molding machines comprise a frame indicated generally at 10. The frame includes a base 11 and a fixed platen 12 connected to the base by a plurality of rods 13. A movable platen 14 is reciprocably mounted on the rods 13 for movement toward and from the platen 12. The platen 14 is reciprocated by a hydraulic cylinder generally indicated at 15. The platens 12 and 14 carry respective mold supporting members 16 and 17 (FIG. 3). As shown, the members 16 and 17 are chambered as at 18 and 19 respectively for the circulation of a heating fluid. One half of a mold member 20 is releasably secured to member 16 by any suitable means as by removable pins, one of which is shown at 21, and the other mold half 22 is similarly secured to member 19 as by pins 23. The mold halves are registered with respect to each other in the mold supporting members 16 and 17 by pins, one of which is shown at 24.

The mold members 20 and 22 are in the form of relatively thin, light discs, weighing only a few pounds capable of being handled manually. In practice a mold change is quickly effected as by closing the press, releasing the pins, or other means by which the mold members are secured to the press platens, opening the press to leave the mold member on the lower platen, removing the mold members and replacing them with the desired mold replacement, again closing the press and locking the mold members to their respective platens. When thus placed and secured in the heated platens the light, thin mold members quickly reach operative temperature. Thus the time and cost of effecting mold changes is greatly reduced and the mold costs are minimized.

As best shown in FIG. 3 the charge conditioning cylinder 27 extends upwardly of the platen 12. The cylinder 27 extends through the platen 12 and upper mold supporting member 16, its lower end being reduced in diameter as indicated at 28 to engage in a recess 29 formed in the upper face of the mold member 20. The portion 28 seats in an annular ring 30 fixed in the recess 29. Mold charge transfer plunger 31 is reciprocably mounted in the cylinder 27 and reciprocated therein by hydraulic cylinder 32. In FIG. 1 the hydraulic cylinder 32 and charge condition cylinder are disposed coaxially while in FIG. 2 the cylinders are disposed in side-by-side relation providing vertically a more compact unit.

Referring in detail to the molding machine shown in FIG. 1, the cylinder 27 extends through a bracket 25 supported by rods 26 which extend upwardly from plates mounted on the platen 12. A bracket 33 is supported by the rods 26 and provides means for supporting the hydraulic cylinder 32. The lower end of plunger 31 extends through an opening 34 (FIG. 3) in the upper mold half to position its free end flush with the inner surface of the mold at the termination of its downward stroke as later more fully described. At the upper end of its stroke, the end of the plunger 31 is positioned above an opening 35 in cylinder 27 through which a measured charge of the molding powder is admitted to the interior of the cylinder 27. The plunger may be withdrawn from the cylinder for cleaning its tip as will be described below in conjunction with the detailed description of the machine shown in FIG. 2.

Figure 4:
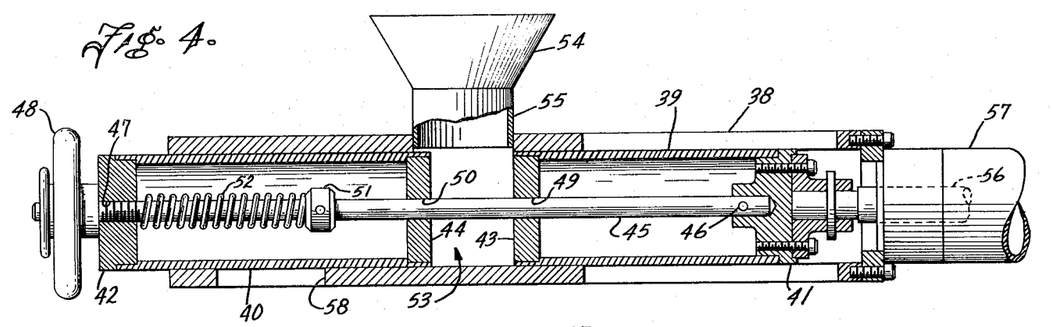
FIG. 4 is a detail sectional view, substantially on line 4—4 of FIG. 1 showing a volumetric charging device.

The charge introduced in the cylinder 27 is measured, by weight or volumetrically, by any suitable means. As shown, a volumetric measuring device generally indicated at 36 is supported by a bracket 37 extending from bracket 26. As shown in FIGS. 1 and 2 the measuring device comprises a cylindrical housing 38. Within the housing 38 (FIG. 4) are reciprocably mounted two aligned spaced cylindrical members 39 and 40. The outer ends of members 39 and 40 are fixed to respective heads 41 and 42, their inner adjacent ends being closed by members 43 and 44. Heads 41 and 42 are connected by a rod 45, one end of which is fixed as at 46 to the head 41, the other end extending through an opening 47 in head 42, the latter end being threaded to receive a handwheel 48 disposed outwardly of head 42. The rod 45 extends through openings 49 and 50 in heads 43 and 44, and carries a fixed collar 51 between which and head 42 a spring 52 is compressed. By this arrangement the spacing between the heads 43 and 44 may be varied by rotation of handwheel 48. As the member 40 is moved toward and from member 39 by the rotation of handwheel 48 and the action of spring 52 the capacity of chamber 53 between the heads 43 and 44 is varied. Molding material in the form of a coarse or granular powder is fed by gravity into the chamber 53 from a hopper 54, when the chamber 53 is aligned with the hopper spout 55, as shown in FIG. 4. The members 39 and 40 are reciprocated in the support 38 by means of a rod 56 carrying a piston head (not shown) operating in a hydraulic cylinder 57 whereby the chamber 53 is moved from registration with spout 55 into registration with a discharge opening 58 formed in the housing 38. The thus measured charge of molding material discharges by gravity through opening 58 and a spout 59 (FIG. 1) communicating with opening 35 into the cylinder 27.

Figure 5:
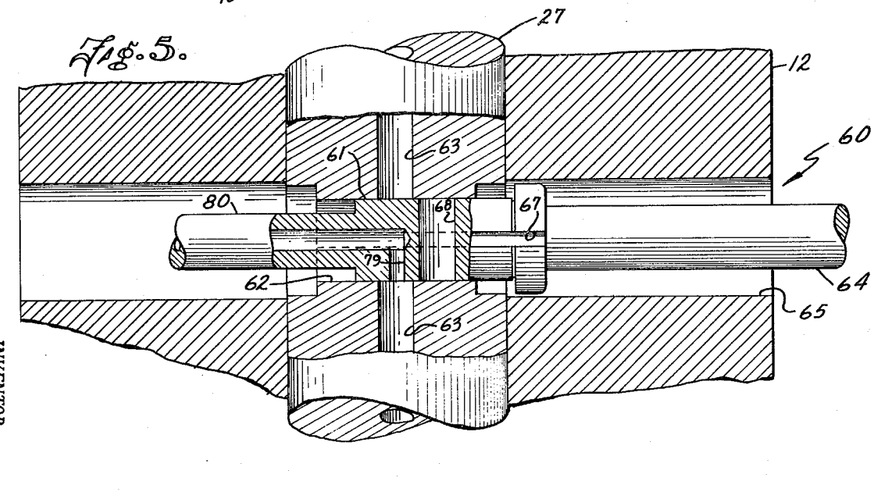
FIG. 5 is a detail view of the cylinder gate and article stripping device.

As shown in FIGS. 1 and 5 a gate member generally indicated at 60 is provided to close the cylinder 27 adjacent its lower end. As best shown in FIG. 5, the gate member 60 comprises a cylindrical member 61 slidably fitting in a bore 62 extending transversely of the bore 63 of cylinder 27. Member 61 is carried at the end of a rod 64 which extends through an opening 65 formed in platen 12 and is reciprocated by a conventional hydraulic cylinder 66 (FIG. 1). Member 61 is provided with a keyway 67 (FIG. 5) engaged with a key in bore 62 to prevent rotation of the member 61. A transverse bore 68 is also provided which is movable into and out of alignment with cylinder bore 63 to open and close the latter.

As the mold charge is admitted to the upper end of the cylinder 27, as above described, gate 60 is maintained in position closing the lower end of cylinder 27, as shown in FIG. 5. Cylinder 27 may then be brought to a predetermined temperature by any suitable means such as electric heating units 70 (FIG. 1) encircling the cylinder. The temperature of the cylinder may be controlled by any suitable means such as a rheostat (not shown) for controlling the current flow to the heating units. It has been found that the temperature of the cylinder depends upon the amount of catalyzation of the resin, highly catalyzed resins requiring little or no preheating in the cylinder 27.

Immediately following the entrance of the mold charge to cylinder 27, the gate 60 being closed as above described, plunger 31 is advanced downwardly, by the admission of pressure to cylinder 32, to compress the charge between the plunger and gate 60 while at the same time it is being heated in the cylinder. The advance of plunger 31 is controlled to apply predetermined pressure for a predetermined time to compact the heated charge, and expel or permit the escape of air and other gases from the charge. The fit of the plunger in the cylinder 27 permits the gases to escape between the plunger and cylinder walls while preventing the flow-by of the charge. The heat and compression are such as to convert the charge from its granular form to a partially cured mass of optimum plasticity, density and state of cure preparatory to its introduction into the heated mold. Plunger 31 remains stationary in its partially advanced position until the charge reaches this optimum condition. Gate 60 is then moved from the position of FIG. 5 to bring the bore 68 into alignment with the bore 63 of cylinder 27. The plunger 31 is then advanced to rapidly transfer the so-conditioned charge from cylinder 27 into the mold cavity, the advance of the plunger being controlled to bring its free end face flush with the inner surface of mold member 20 as shown in FIG. 3. The mold charge, as it is held under heat and pressure in the cylinder 27 by the plunger 31 and gate member 61, has a volume slightly greater than the volume of the mold cavity and is further compressed by that amount within the mold cavity itself.

It has been found advantageous to control the temperature of the plunger tip. While as shown and described the temperature control takes the form of a heating element, cooling means may be employed if circumstances require.

Figure 6:
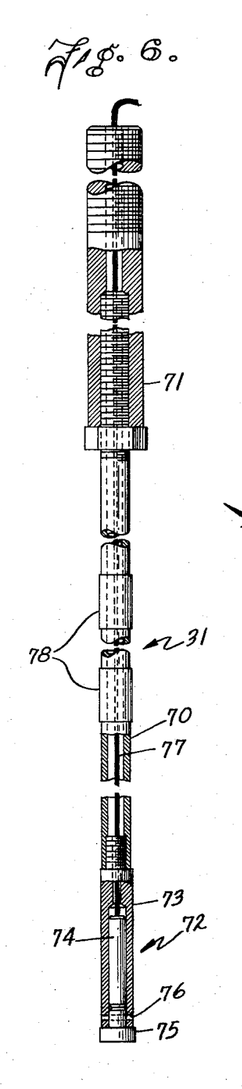
FIG. 6 is a sectional view of the compression and transfer plunger.

Referring to FIG. 6 the plunger 31 comprises a tubular rod 70 threaded at its upper end into a coupling member 71 by which the plunger may be connected to the rod of a driving piston, such as 32 (FIG. 1). A plunger tip 72 is threaded into the lower end of the rod 70 and comprises a tubular member 73, an electrical heating element or cartridge 74 disposed in the bore of the member 73, and a head 75 removably fitted in the lower end of the tubular member and held in place by a cross pin 76. The electrical heating element may be connected to a source of current (not shown) by suitable means such as the conductor 77 which extends upwardly through the bore of the plunger to the source of electricity. The temperature of the heating element may be controlled by any suitable means such as a rheostat (not shown). It has been found preferable to have the working face of the plunger tip heated to the mold temperature at least when in its mold closing position, FIG. 3.

The diameter of the head 75 makes a sufficiently close fit in the cylinder bore 63 and the opening 34 in the mold to substantially prevent flow of the molding material between the head and the cylinder wall while permitting the escape of air and other gases therebetween. When the power charge is compacted by the plunger, air in the charge is expelled and escapes past the plunger tip. Other gases which are generated during the conversion and curing of the charge under heat and pressure in the cylinder and in the mold cavity also escape past the plunger tip.

The head 75 of the plunger is formed of slightly softer metal than the walls of the cylinder 27 so that any wear resulting from the operation of the plunger is sustained by the removable and easily replaceable head 75, rather than the cylinder, in view of the fact that the diameter of the head is slighty larger than the plunger.

The rod 70 may be and as shown is provided with a plurality of bearing rings or sleeves 78 spaced axially along the rod for preventing bending or buckling of the rod in the cylinder. The outer diameter of the rings 78 is slightly less than that of the head 75. The rings 78 may also be made of relatively soft metal such as the plunger tip to reduce wear of the cylinder wall.

While the charge is being cured, the mold members 20 and 22 are held tightly closed under sufficient pressure to prevent flash extensions at their mating edges except at extremely thin narrow vents, as indicated at 72′, FIG. 3. Upon completion of the cure, plunger 31 is retracted, gate 60 is moved to close the lower end of cylinder 27, as in FIG. 5, and the platen 14 lowered to open the mold. The upper mold half 20 is so formed as to assure retention of the molded article in the upper mold half as the mold opens. Gate 60, as shown in FIG. 5, is provided with a passage 79, which, as the gate is moved to closed position, opens downwardly through that portion of the cylinder bore 63 which is below the gate. Passage 79 is connected by a suitable conduit 80 to a source of compressed air, not shown, and as the mold opens compressed air is supplied to conduit 80 to blow the finished article from the mold.

As shown in FIG. 1, an article receiving chute 81 is pivotably mounted on the base 11 by means of arms 83 fixed to the chute. Arms 83 carry a pin 84 sliding in cam slots 85 formed in a bracket 86 fixed to the platen 14, whereby chute 81 may be swung into the position of FIG. 1, as the platen 14 is lowered, to receive the article as it is stripped from the mold and transfers it to a belt or other suitable article receiving means (not shown). Upon upward movement of platen 14, to close the mold, chute 81 is retracted to a position at the side of the platens.

In the molding of tableware and similar articles, it is frequently desirable to decorate the surface of the article during the molding. One common method of effecting such decoration is by opening the mold, when the article has achieved a predetermined state of cure and inserting a thin sheet of resin impregnated material carrying the desired design, commonly referred to as a "foil." The foil may be positioned on the partially cured article or the opposing mold member. The mold is then closed to complete the cure, the foil and design being thereby incorporated in the surface of the mold.

Figure 7:
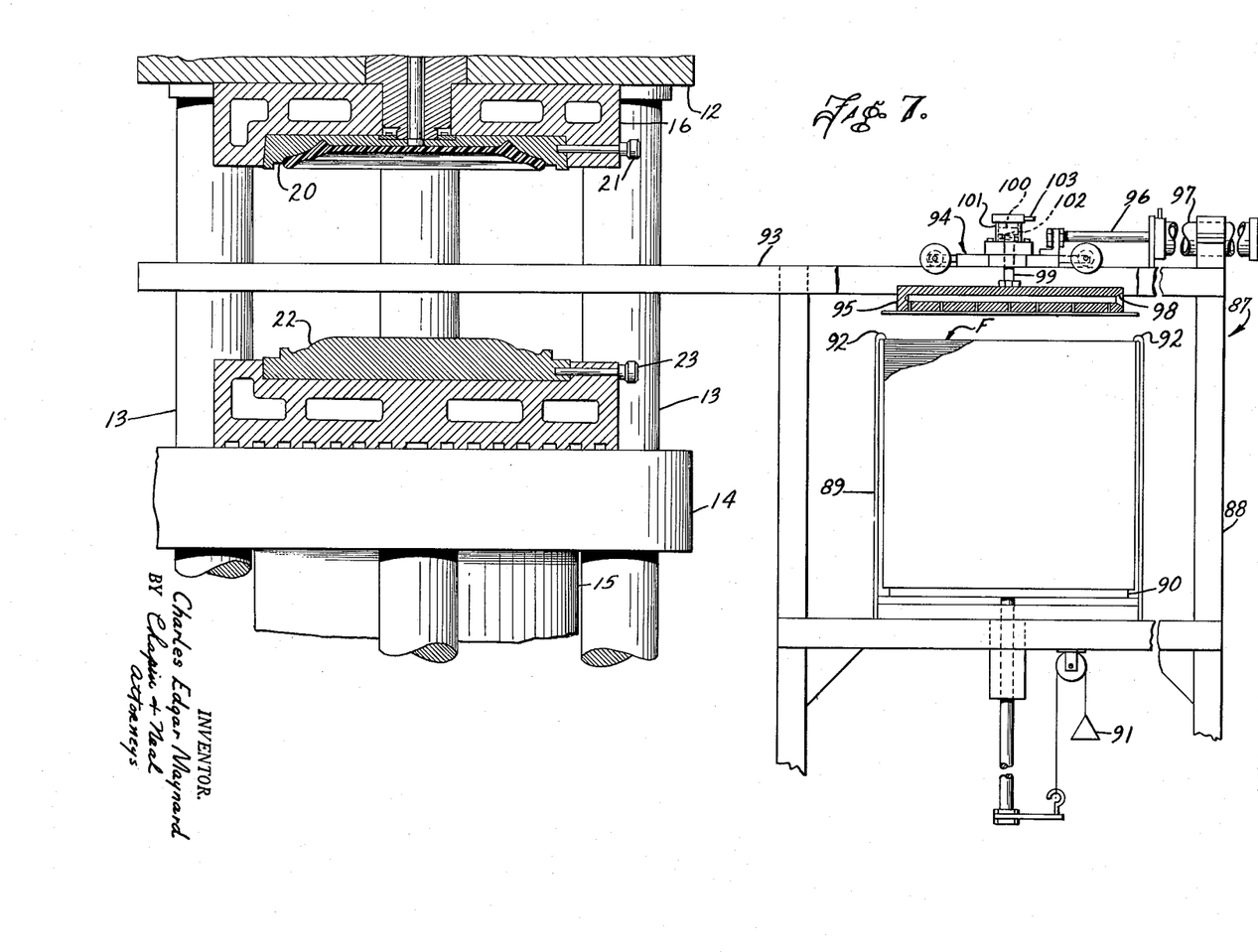
FIG. 7 is a view illustrating means for inserting a decorative foil between the mold members.

The machines embodying this invention are adapted to include means for the automatic insertion of such a foil if desired and means for this purpose are shown generally at 87 in FIG. 1 and in more detail in FIG. 7. Referring to the latter figure such means are shown as comprising a frame 88 supporting a magazine 89 for holding a stack of foils F which rest on an elevator 90 urged upwardly by means such as a weight 91 to maintain the uppermost foil against retaining lugs 92. The frame 88 includes a pair of rails 93 which as shown in FIG. 7 extend between the press platens at the sides of the mold members and their supporing members 16 and 17. A carriage 94 is reciprocably mounted on the rails 93 for travel to and from a position over magazine 89 and a position over the lower mold member 22. Carriage 94 carries a suction head 95 mounted for vertical reciprocation thereon. Carriage 94 is reciprocated on its supporting rails 93 by a piston 96 working in a fluid pressure cylinder 97. Suction head 95 is connected to suitable source of suction (not shown) through a suitable line 98. Suction head 95 is fixed to the lower end of a rod 99 connected to a piston 100 working in a cylinder 101 and normally held in raised position by a spring 102. Upon admission of fluid pressure, through a line 103, above piston 100 the suction head is forced against the action of spring 102 into engagement with the topmost foil in magazine 89 and upon release of the pressure in cylinder 101 the suction head is returned to raised position and carries the topmost foil with it, the suction being sufficient to strip the foil past lugs 92.

The mold having been opened, the partially cured article being retained in the upper mold member, carriage 94 is moved to position the foil carried by the suction head on the lower mold member. Pressure is again supplied to cylinder 101 to bring the foil into contact with the lower mold member to which it adheres by reason of the tackiness of the resin content of the foil as it is brought into engagement with the hot mold surface and is thereby stripped from the vacuum head as pressure is relieved from cylinder 101 and spring 102 returns the suction head to its raised position. The carriage 94 is then returned to its position over the magazine 89 and the mold again closed.

Article receiving chute 81 has been omitted from FIG. 7 but it will be understood that the carriage 94 passes beneath the chute in positioning the foil on the lower mold member or alternatively the chute may be yieldingly mounted to be displaced by the carriage.

As will be apparent the temperature of the cylinder 27 and the mold members are subject to accurate control and are maintained constant at the desired temperatures appropriate for a given molding material.

The successive operations are hydraulically actuated by the cylinders 15, 32, 57 and 66 and suitable valve means controlling the flow of compressed air to conduit 80, and when foil decoration is employed the foil depositing means will be controlled by the timing of the actuation of cylinders 97 and 101.

All of these means are capable of controlled operation in precise predetermined timed sequence by conventional timing devices for actuating the valves which control the admission of fluid pressure to the several cylinders and compressed air to conduit 79. Such automatic control devices are diagrammatically indicated in FIG. 1 at 105 and the dotted lines connecting the several actuating elements thereto.

Figure 8:
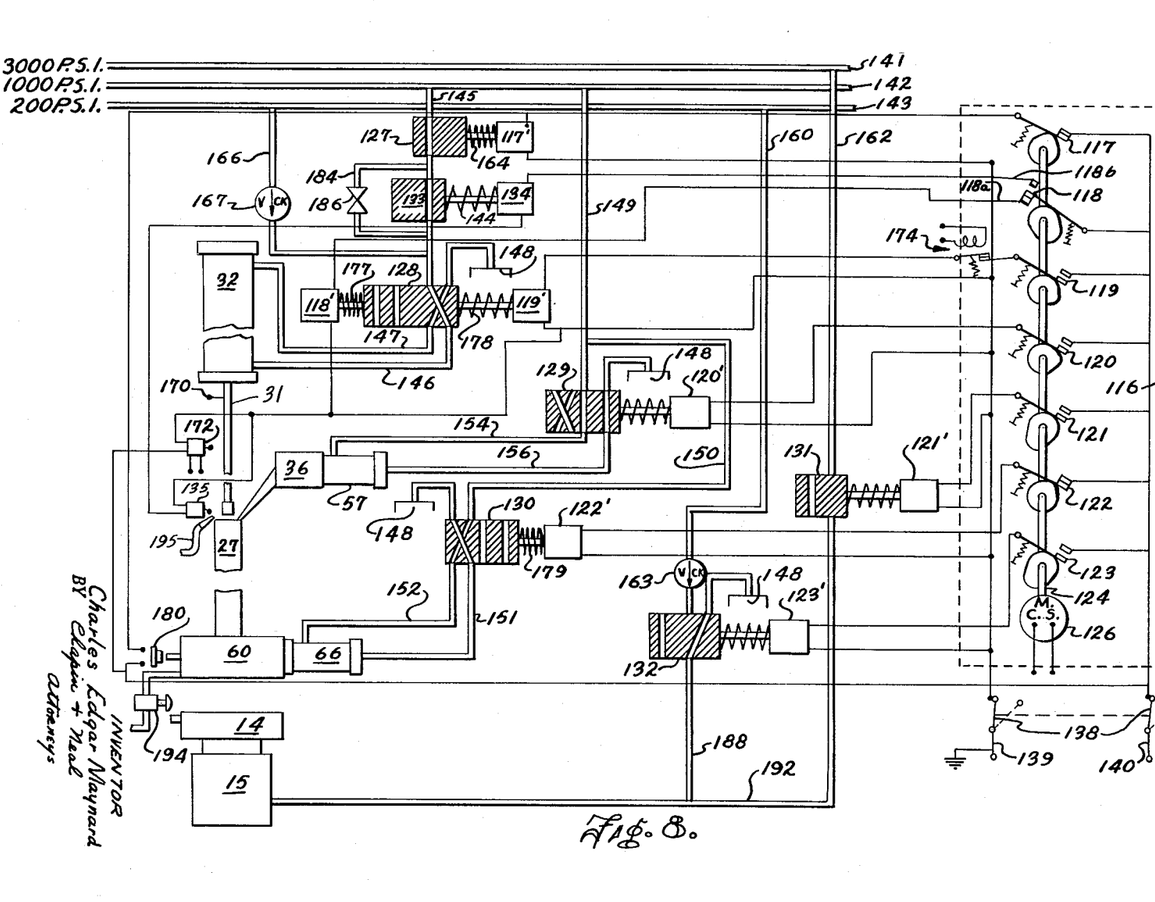
FIG. 8 is a diagrammatical view showing a timing and control system for automatically controlling the molding apparatus.

An illustrative timer and hydraulic system for automatically controlling the operation of the molding machines shown in FIGS. 1 and 2 is diagrammatically shown in FIG. 8. As shown in FIG. 8, a timer 116 comprises a plurality of cam actuated switches 117 through 123. The cams may be, and as shown, are mounted on a common shaft 124 which is driven by suitable means such as a constant speed motor 126. The cam actuated switches control the operation of a plurality of solenoid actuated valves 127 through 132, the solenoids being indicated by reference characters 117′ through 123′ corresponding to the switch which controls them. Another valve 133 is actuated by a solenoid 134 which is connected in series with terminal 118b of a double throw switch 118 and a normally open limit switch 135. The valves in turn control the operation of the hydraulic cylinder 32, the feed cylinder 57, gate cylinder 66 and the hydraulic press 15, all described above. While the control circuit is shown in conjunction with the FIG. 1 embodiment of the invention, it also automatically controls the operation of the machine shown in FIG. 2.

In general, the hydraulic pressures employed are relatively high, it being particularly essential that the platens be rigid and the pressure holding the mold closed, or the mold clamping pressure, be high enough to prevent uncontrolled flash from any cause. Any release of clamping pressure destroys luster and results in variations in the density of the finished product.

In FIG. 8 the valves and parts are shown disposed in the positions they occupy at the end of one cycle of operation of the machine and preparatory to the next cycle thereof. The timer 116 includes an "on-off" switch 138. Terminals 139 and 140 are adapted to be connected to a suitable current source, terminal 140 being shown connected to the "hot lead" and 139 the return or ground line. The motor 126 is also adapted to be connected to a suitable current source, not shown. The hydraulic system includes three lines—141, 142 and 143—supplying fluid under high, intermediate and low pressures respectively. The pressures provided by these lines may be as necessary or desirable to accomplish a particular molding operation and for purposes of illustration, as shown, are 3,000, 1,000 and 200 lbs. per square inch respectively.

Prior to the commencement of a cycle of operation, as shown in FIG. 8, solenoid 117′ is in an energized condition holding the valve 127 open; the timer switch 117 being held closed by its cam. Solenoid 134 is deenergized and the valve 133 is held open by its spring 144. The movable arm of timer switch 118 is engaged with lead 118a energizing solenoid 118′ which holds valve 128 positioned as shown in the figure. With the valves 127, 133, and 128 positioned as shown, the fluid pressure in line 142 is transmitted by lines 145 and 146 to the under side of the piston within the cylinder 32. A check valve 167 in line 166 prevents the flow of fluid from line 145 to line 143. The plunger 31 is thus maintained in its retracted or "up" position. The upper end of the cylinder 32 "exhausts" through line 147 and the valve 128 to the fluid reservoir or low pressure side of the hydraulic system, as indicated at 148. At this time solenoid 122′ is also energized by timer swtich 122 and valve 130 is positioned as shown; fluid pressure from line 142 being transmitted to one end of the gate cylinder 66 by lines 149, 150 and 152. This holds the gate 60 in closed position, as shown in FIG. 5. A line 151 exhausts the other end of the cylinder 66 through the valve 130, as indicated at 148. At this time in the operating cycle the other solenoids are not energized and the valves which they control are positioned as shown in FIG. 8. Pressure is transmitted from the 1,000 lb. line 142 by line 149, through the valve 129, and line 154 to the powder feed cylinder 57. This pressure holds the volumetric measuring device 36 in the position shown in FIG. 4. A line 156 exhausts through the valve 129, as indicated at 148. Solenoids 121′, 123′ are both deenergized and the valves 131 and 132 are positioned as shown, the pressure in lines 160 and 162 being shut off from the hydraulic press 15. The platen 14 thus remains in its "down" position.

A cycle of operation is commenced by the closure of switch 120 by its cam. This energizes solenoid 120′ which draws the valve 129 to the right. The pressure in line 149 is then connected to the opposite end of feed cylinder 57 by means of the line 156. The volumetric measuring device is thus moved to deposit its charge through the opening 58, shown in FIG. 4, into the cylinder 27. The switch 120 is then, or subsequently, but prior to the termination of the cycle, opened by its spring and the valve 129 is returned to the position shown in the drawings and the volumetric device is positioned to receive another charge.

Solenoid 117′ is deenergized by the opening of switch 117 in the time, and the valve 127 is closed by spring 164. This action shuts off line 145. Solenoid 118′ is also deenergized, the movable arm of the switch 118 being moved by its cam into engagement with the lead 118b. Solenoid 119′ is energized by timer switch 119. The valve 128 is moved to the right from the position shown in FIG. 8 and the line 143 is connected to the upper end of cylinder 32 by means of lines 166 and 147. Line 146 exhausts the lower end of cylinder 32. The plunger 31 is moved downwardly in the cylinder 27 by a pressure of 200 lbs. per square inch, compressing the charge as described above until a contact 170 actuates a limit switch 172. The limit switch 172 operates a time relay 174, within the timer 116, breaking the electrical circuit of the solenoid 119′ for a predetermined time. The electrical connection of switch 172 and relay 174 is omitted in order to simplify the drawings. Solenoid 119′ is thus deenergized and the valve 128 is positioned in a closed or neutral position by balanced springs 177 and 178 of solenoids 118′ and 119′. In this position of the valve 128, the lines 146 and 147 are both closed and the charge deposited within the cylinder 27 is held in a compressed condition and heated in the manner described above.

While the compressed charge is being heated to advance its cure as described above, solenoid 123′ is energized by timer switch 123. The valve 132 connects line 160 to line 188 and fluid under 200 lbs. per square inch is transmitted to the hydraulic press 15. The platen 14 is moved upwardly closing the mold. Solenoid 121′ is then energized by timer switch 121 opening valve 131. High pressure is transmitted by lines 162 and 192 to press 15 through the open valve 131, putting "full clamp" on the mold. The pressure supplied and the working area of the piston in the press 15 are selected to provide sufficient pressure to prevent any separation of the mold members under the injection and molding pressures employed. A check valve 163 blocks flow of fluid from line 192 to line 160 when valves 131 and 132 are both open.

Solenoid 122' is deenergized by its timer switch 122 and the valve 130 is moved to the left from the position shown in FIG. 8 by spring 179. This connects line 150 to line 151 and 1,000 lbs. pressure opens gate 60 bringing the bore 68 into alignment with the bore 63 of cylinder 27, see FIG. 5. When the gate is opened it closes a limit switch 180, one side of which is connected to the current source lead 140 and the other side to the coil of solenoid 117'. Solenoid 117' is thus energized by the limit switch 180 and valve 127 is opened. Solenoid 119' is substantially simultaneously energized by its timer switch 119, the relay switch 174 in line 176 having been closed, moving the valve 128 to the right from its neutral or closed position. The 1,000 lbs. pressure in line 142 is thus connected to the upper end of cylinder 32 by lines 145 and 147, and the plunger 31 is moved downward rapidly under this pressure to transfer or inject the charge into the mold. When the plunger is moved to a predetermined position short of complete transfer of the charge into the mold, contact 170 on the plunger closes the limit switch 135 and solenoid 134 is energized closing the valve 133 which shuts off line 145. A line 184 by-passes valve 133. The by-pass line includes an adjustable needle valve or restriction 186 which slows the downward movement of the plunger 31 in the terminal portion of its injection stroke, as described above. The relationship of the area of the working face of the plunger tip to the size of the piston in the operating cylinder 36 is such that charge in the mold is subjected to a pressure sufficiently high to achieve minimum molding time.

Conditions remain unchanged until the plastic is cured in the mold. At the completion of the cure, solenoid 123' is deenergized by switch 123 and valve 132 is returned to the position shown in the drawings, line 188 exhausting through the valve. Solenoid 121' is also deenergized by the opening of its timer switch 121 and valve 131 is closed shutting off line 162. Platen 14 opens by gravity. The movable arm of the double throw timer switch 118 engages lead 118a energizing solenoid 118' and deenergizing solenoid 132. The valves 128 and 133 are positioned as shown in the drawings. Line 142 is thus connected to the lower end of the cylinder 32 by lines 145 and 146 and the pressure of 1,000 lbs. per square inch moves the plunger 31 upwardly. Limit switch 135 is released by contact 170 and it returns to its normally open condition ready for actuation in the next cycle. When the plunger 31 has moved upwardly sufficiently, solenoid 122' is energized by its timer switch 122, closing gate 60. A valve 194 is actuated by the downward movement of the platen 14 admitting compressed air to the passage 79 (FIG. 5) to eject the finished article from the mold. Means may be provided to clean the tip of the plunger 31. The tip of the plunger may be withdrawn from the cylinder and cleaned by a jet of compressed air from a nozzle 195.

If it is desired to decorate the articles being molded, when the article reaches a correct degree of cure, the mold may be opened at a predetermined time by the switch 123 to the timing mechanism causing valve 132 to exhaust the hydraulic press 15. Another switch (not shown) may be provided in the timing mechanism to operate the device 87 (FIG. 7) to place a foil on the lower mold member after which the mold would again be closed by operation of the switch 123.

As stated above, the machine shown in FIG. 2 comprises a hydraulic cylinder 32 mounted in parallel side-by-side relation with the heating cylinder 27. The cylinder may be heated by any suitable means such as described above in relation to FIG. 1. Both cylinders are mounted on a base plate 196. Rods 198, 200 and 202 extend upwardly from the base through a plate 204 on which is mounted means for charging the cylinder 27. A top plate 205 is supported by the upper ends of the rods 198, 200 and 202.

Figure 9:
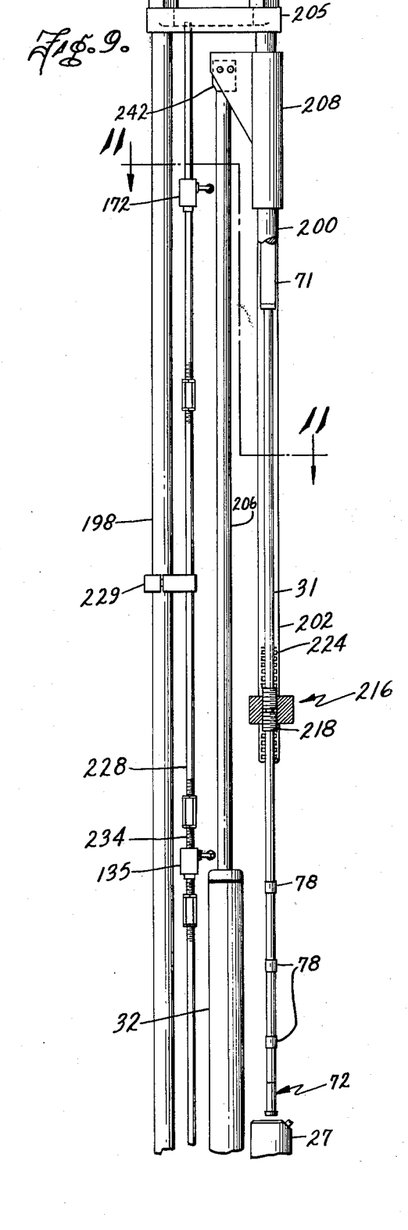
FIG. 9 is a side elevation of the molding machine shown in FIG. 2.

Means for operating the plunger 31 comprises piston rod 206 which is connected at its upper end to a yoke 208. The yoke is slidably disposed on the rods 200 and 202. The upper end of the plunger is connected to the yoke 208 by any suitable means such as an adaptor or coupling member 71 (FIGS. 6 and 9). A pair of toothed bars or racks 212 are carried by the yoke and extend downwardly therefrom meshing with pinion gears 214 (FIGS. 2 and 10), carried by a guide member 216.

Figure 10:
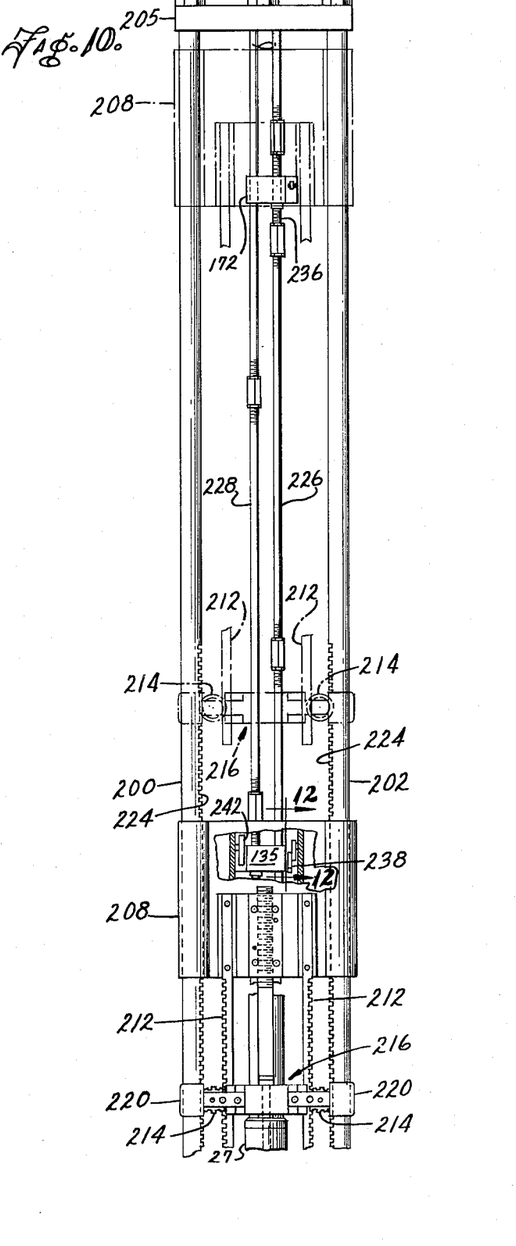
FIG. 10 is a front view of the machine shown in FIG. 9.

The guide member 216 is slidingly mounted on the rods 200 and 202 and includes a bushing 218 (FIG. 9) through which the plunger 31 extends. The bushing may, and as shown is, in two parts oppositely threaded into the guide member. This arrangement permits adjustment of lower stop position of the plunger in which the lower end surface of the bushing abuts the upper surface of the cylinder 27, such as shown in FIG. 10. The gears 214 are rotatably supported between spaced opposed arms 220 of the guide member. The outer ends of the arms are in the form of shoes slidably engaged with opposite surface portions of the rods 200 and 202.

Stationary racks 224 are provided on the opposed inner surface portions of the rods 200 and 202. The pinion gears are meshed with the stationary racks as well as the movable racks 212 carried by the yoke.

With the plunger 31 at the upper end of its stroke, the plunger guide 216 is disposed half the distance between the lower end of the adaptor 71 and the upper end of the cylinder 27. As the yoke 208 is moved vertically downward by the piston rod 206 the racks 212 are carried at the same rate, rotating the gears 214. As the gears are rotated, they move or "walk" rectilinearly along the fixed racks 224 and carry the guide at half the rate of movement of the yoke 208. The guide 216 is thus maintained in a position centered between the yoke and clamp cylinder 27 throughout the stroke of the plunger, thus imparting rigidity to the small diameter plunger throughout its stroke and overcoming any tendency to bow or buckle.

As described in conjunction with FIG. 8, the operation of the plunger 31 is controlled by the limit switches 172 and 135. As shown in FIGS. 2 and 10, the limit switches are mounted on a pair of rods 226 and 228 which are rotatable for adjusting the vertical positions of either or both of the switches. The rods are rotatably supported by the top plate 205, a bracket 229 (FIG. 9), and the center plate 204 (FIG. 2) through which the rods extend. The lower ends of the rods are provided with knobs 230 which are used for adjusting the vertical positions of the limit switches.

Figure 11:
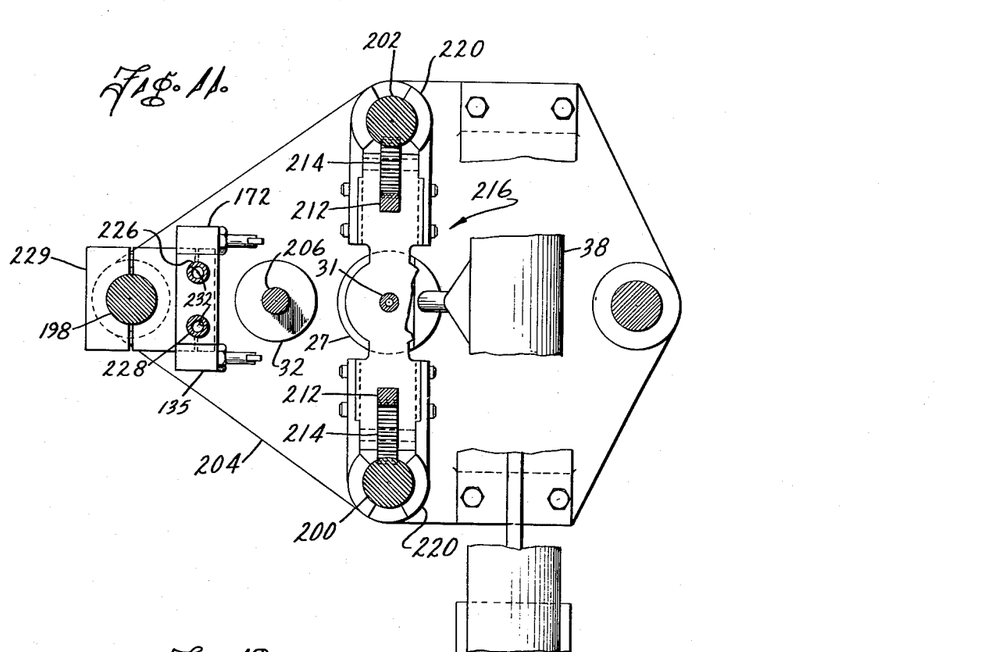
FIG. 11 is a section taken along line 11—11 of FIG. 9.

The limit switches 172 and 135 each comprise a block portion which is provided with a pair of spaced holes 232 (FIG. 11) through which the switch adjusting rods extend. One of the holes in each of the blocks is threaded. The blocks are disposed in reverse end-to-end relation so that the threaded holes are engaged with threaded portions 234 and 236 (FIGS. 9 and 10) of the adjusting rods. By this arrangement, the position of each switch may be independently adjusted as desired. Rotation of the rod 226 will raise or lower the position of the switch 172, the other rod 226 preventing rotation of the switch block. Rotation of the rod 228 will raise or lower the other limit switch 135.

Figure 12:
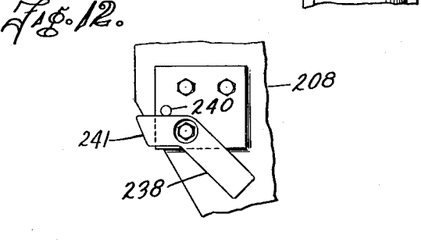
FIG. 12 is a section taken along line 12—12 of FIG. 10.

The means for actuating the limit switches in relation to the position of the plunger tip in the cylinder 27 was shown diagrammatically at 170 in FIG. 8. As shown in FIGS. 10 and 12, the switch actuating means comprises a lever or dog 238 pivotably mounted on the yoke 208. A pin 240 holds the dog in a position so its edge 241 will engage and trip the upper limit switch 172 when the yoke is moved downwardly past the switch. However, when the dog contacts the limit switch during upward movement of the yoke, the switch is not actuated since the dog is pivoted by the switch. The configuration of the dog is such that it is returned by gravity to its switching position (FIG. 12) after it is released by the switch 172. As described above, when the limit switch 172 is actuated the downward travel of the plunger is stopped for a predetermined time until the charge in the cylinder is properly pre-conditioned for transfer into the mold.

A fixed plate 242 (FIGS. 2, 9 and 10) is also mounted on the yoke 208 for actuating the lower limit switch 135 when the plunger tip is positioned a short distance, which may be in the order of ¼", above the lower surface of the upper mold plate. The plunger is thereafter moved slowly until it is disposed in its FIG. 3 position. The vertical position of the lower switch 135 may be adjusted to control the extent of the terminal movement of the plunger. After an article has been molded, upward movement of the plate 242, carried by the yoke 208, will release the switch 135.

The upper switch 172 is adjustable vertically to a predetermined position which is a function of the amount of charge to be placed in the heating cylinder for molding a given article. The cylinder is of a length to accommodate a volume of powdered resin sufficient for molding the largest item which the machine is designed to handle. When used for molding dishware, the capacity of the heating cylinder is made sufficiently large to receive enough powder to mold a large size dinner plate. For smaller items, less powder is placed in the cylinder and the position of the limit switch 172 is adjusted downwardly a predetermined distance.

The machine shown in FIG. 2 is provided with a volumetric measuring device 36 for supplying a measured charge of powdered resin to the cylinder 27. In general, this is substantially the same as shown and described with reference to FIG. 1. In the FIG. 2 machine, the hopper 244 may be provided with a viewing window 246 which facilitates maintaining the hopper adequately supplied with powdered resin. The machine shown in FIG. 2 also includes the gate member 60 substantially as shown and described above as well as an article receiving chute as described at 81 in FIG. 1 if desired. A foil insertion device shown and described at 87 in FIG. 7 may also be included.

In operation the temperatures of the cylinder and mold member, the speed of movement of the plunger 31, the timing of the initiation, dwell and resumption, termination and reversal of its movements, and the timing of the feed of the charge and the opening and closing of the mold are all correlated to effect the basic concept of the invention that the cure and forming of a thermosetting plastic article be made a continuous procedure with the prescribed conditions prevailing.

The mold is closed and its uniform heating assured while the charge is being conditioned in the heated cylinder to just the right plasticity and stage of cure. On opening the gate, the cylinder and mold cavity provide essentially a single chamber at optimum temperatures. Thus the flow of the charge into the mold cavity takes place with both the charge and mold at optimum condition. At not time is there an interruption in the continuity of the transformation from the uncured to cured condition of the composition. The transformation takes place throughout under precisely controlled optimum conditions of heat and pressure with respect to the flow, the advancing stages of cure of the material, and the densifying of the charge to the capacity of the mold as the final stage of the curing reaction takes place.

It is emphasized that the continuity of procedure, above referred to, means continuity of transformation of the resin rather than continuity or uniformity of a given mechanical operation—for example for a given molding compound it may be advantageous during the compression of the charge between the plunger and gate to vary the rate at which the plunger is moved as the charge absorbs heat or after the gate is opened to progressively or otherwise slow the rate of movement of the plunger as the latter portion of the partially cured material fills the mold so that the final compression takes place in conformity with the state of cure of the flowing material. Adjustable limit switches, in addition to those shown, may be used in connection with the above mentioned timer to control such variations in the movement of the plunger.

It will also be understood that while for perhaps the majority of molding compositions both the pressures and temperatures employed in the cylinder 27 will be relatively high the absolute pressure and temperature will depend on the material and in some cases the cylinder may be at substantially room temperature. In general, and as indicated in the example hereinafter given, the cylinder 27 will usually be maintained at a somewhat lower temperature than the mold. In any event the cross sectional dimensions of cylinder 27, of its bore 63 and of plunger 31 are such that the charge being processed in the cylinder may be quickly and uniformly brought to the desired temperature.

Bearing in mind that it has been found important to advance the cure of the compressed column of powder in the cylinder 27 uniformly, the proper temperature of the cylinder 27 is governed by what might be called the coefficient of heat conduction of the powder charge when it is compressed in the cylinder. All plastics are good insulators, and correspondingly poor heat conductors. The optimum time cycle is achieved when the diameter of the powder column to be heated and the applied temperature are such that the column is uniformly heat penetrated and raised to the desired temperature in the minimum time. Experience has indicated that while temperatures below the optimum may, to some extent, in practice, be compensated for by an increase in the heating time, the attempt to materially shorten the heating time by an increase in temperature tends to result in an over degree of cure of the powder column at its outer portions.

As later pointed out the present invention makes possible the use of molding powders having a degree of advanced cure or catalyzation far beyond that which can be handled by conventional methods and machines. With such materials it may be found desirable to apply pressure, without the application of heat, to the charge in the cylinder 27. Under operating conditions where the charge entering the cylinder is at a temperature substantially the same as that desired during the compression of the charge in the cylinder so that no substantial heat exchange need take place in the cylinder, limitations on the diameter of the cylinder based on the coefficient of heat conduction of the powder are removed.

The invention is not limited in its utility to any particular molded product but it is particularly useful in the production of articles such as tableware and the like where color runs or a run of plates or other item may vary in quantity to meet sales or inventory requirements over relatively short periods, since mold changeovers are quickly made and, with the change in material supplied to the feed hopper, represent the only production hold up aside from simple machine adjustments in the feeder and timers.

The machines illustratively shown in FIGS. 1 and 2 are for the molding of plates and the mold entrance 34 is located centrally of the bottom of the plate so that the flow distances in the mold are uniform. The positioning of the end of the plunger 31 flush with the inner face of the mold so that it becomes in effect part of the mold surface, and the lack of substantial flash at the mating edges of the mold simplifies the finishing of the articles.

By the machines of the present invention articles of superior and uniform qualities are produced. The invention provides complete control of the cure and density under conditions closely approximating the ideal in these respects, resulting in uniformity, stronger, longer lived and more lustrous moldings. Further the production costs are very substantially reduced and a compact, flexible molding unit provided which is fully automatic in operation eliminating the successive independent processing steps of conventional molding practice.

By way of example and not limitation, employing the machine of the present invention for molding a plate from hard melamine resin compositions the temperature of cylinder 27 may be maintained at approximately 240–260° F. and the mold at approximately 340–360° F. Considering the volume of the granular powder charged to cylinder 27 as 100% the charge may be compacted in the cylinder 27 between plunger 31 and gate 60 to 86% volume under a pressure of 800–2800 lbs. per square inch for a period of approximately 20 to 30 seconds. At the end of this period gate 60 opens and the plunger 27 advances to completely transfer the charge to the mold cavity in approximately 5 to 8 seconds, the speed of the plunger being reduced during the terminal portion of this transfer period, the cure of the charge being completed in the mold in approximately 15 seconds. In the final filling of the mold, the charge is further compressed to a volume approximating 50% to 56% of the original volume of the powder charge under a pressure of about 14,000 lbs. per square inch. The clamping pressure on the mold as above pointed out is in any case sufficiently high to assure that no separation of the mold members takes place either during the charging of the mold or during cure. Further, in accordance with a basic concept of the invention, the conversion of the charge to its cured state takes place under conditions which, in contrast to prior procedures, at least maintains the curing charge at a proper temperature throughout the program of the conversion—that is, at no time is the ambient temperature allowed to fall, although it may at proper times be increased.

As previously pointed out the invention makes possible, addition to manufacturing economies, improvement in the physical properties of the product. These improvements are attributable to the fact that a substantial portion of the curing or crosslinking of the resin constituent of the compound takes place in the cylinder 27 under controlled temperature and pressure. For example, experience has shown that dishware products having higher luster, greater surface hardness, better resistance to staining from coffee and other materials and greater impact strength are obtainable by the method and apparatus of the invention than by prior molding procedures. Melamine dishware compounds are basically made up of two elements; namely melamine resin and alpha cellulose filler. The melamine resin is the only hard material in the compound and in conventionally molded dishes such luster and surface hardness as the product possesses results from the presence of a surface film of melamine which has been forced to the surface by the compression of the charge in the mold as the charge becomes heated from the hot mold walls. When melamine resin starts to cure it is known that $H_2O$ and formaldehyde gas are formed and that this moisture and gas and the air in the powder impede the crosslinking of the resin reducing the physical properties of the product. The partial opening and immediate closing of the mold during the conventional molding procedure for "breathing" purposes is ineffective to completely or uniformly remove the moisture and gas. In the method and apparatus of the invention the heat and pressure and length of time to which the curing resin is subjected in the cylinder 27 can be accurately adjusted, so that escape of the air, moisture and gas from the charge takes place in the pre-conditioning cylinder and the partially cured charge may enter the mold essentially free of air, moisture and gas, and with the resin uniformly squeezed and sufficiently concentrated at or adjacent the surface of the charge to provide a thicker and more uniform surfacing of the product with pure resin when the shaping and cure is completed in the mold. The result is a product having a higher luster, a harder and a more stain resistant surface and higher impact strength than has heretofore been obtainable. Furthermore, it has been found that the invention permits an increase of over 12% in the resin content of the compound and the use of resin having the highest percentages of catalyzation with a further substantial increase in the surface hardness and impact strength of the molded article and a sharp reduction in the overall mold cycle. Using such highly catalyzed resins, it was also found that little or no heating of the cylinder 27 was required.

In the event that objectionable gas formation occurs in the mold beyond the venting capacity of the small vents 72' the mold may be initially held closed under relatively low clamping pressure until the mold is filled, full clamping pressure then being immediately applied. This proceeding may result in an extremely thin flash which, however, is so thin as to make a trimming operation unnecessary.

For uniform surface hardness of the molded article the mold closing member 22 may be advantageously heated to slightly higher temperature than stationary mold member 20.

The proper time, temperature and pressure for the optimum "pre-cure" of a given resin in cylinder 27 may be empirically determined and with the various controls so adjusted an automatic production of uniform products can be obtained even with critical compounds.

Further variation in the proportional relation between the curing time in cylinder 27 and in the mold, the control of the speed of transfer of the charge from the cylinder to the mold to accommodate the state of cure of the resin at the time of transfer, makes it possible to employ molding compositions compounded to meet specific or special needs and requiring extremely critical curing and molding conditions.

Having thus described this invention what is claimed is:

1. Apparatus for molding articles from a thermosetting plastic material which comprises relatively movable mold members forming a mold cavity when the members are in closed relation, one of said mold members being provided with an entrance opening, a chamber communicating with said opening and conforming in cross section thereto, a plunger mounted for reciprocation in said chamber and opening, a gate to close the end of said chamber adjacent said mold opening, means to introduce a measured charge of molding material into said chamber in advance of the plunger, means to advance the plunger to compress the charge between the plunger and said gate when the latter is closed, and means to open the gate to permit advance of the plunger into said opening to completely transfer the charge from the chamber to the mold and close said opening.

2. Apparatus for molding articles from a thermosetting plastic molding material which comprises mold members relatively movable toward and from each other to close and open the mold, a cylindrical chamber opening at one end to the cavity of one of said mold members, said opening being of the same diameter as the diameter of the cylinder, a gate extending transversely of the cylinder adjacent the mold-end thereof and movable to open and close access from the cylinder to the mold cavity, a plunger reciprocable within said cylinder, said cylinder having an opening to the interior thereof intermediate the gate and the fully retracted position of the plunger to admit a charge of molding material to the cylinder below the plunger, the free end portion, at least, of the plunger making a sufficiently close sliding fit in the cylinder to substantially prevent flow of the molding material between the end portion of the plunger and the cylinder wall, means to close and open the mold, means to close and open the gate, means to advance the plunger in the cylinder to a position short of the gate and to thereafter advance the plunger to position its free end face substantially flush with the surface of the mold cavity and to thereafter return the plunger to retracted position, said gate comprising an elongated member, mounted for reciprocable movement transversely of the cylinder, having a portion which in one position of movement of the elongated member closes the chamber and a second portin provided with an opening conforming to the cross section of the chamber which in a second position of the elongated member is aligned with the chamber to permit passage of the plunger therethrough, the first mentioned portion of the elongated member being provided with a passage opening outwardly of the end thereof and communicating with the portion of the chamber below said elongated member when the latter is in said one position, to permit access of compressed air to said portion of the chamber below the member to eject the article from the mold.

3. Apparatus for molding articles from a thermosetting synthetic plastic material which comprises a sectional mold, providing a molding cavity when the sections are closed, one section of the mold being provided with a closed chamber, cylinder in cross section, communicating with the mold cavity through a cylindrical opening in said section coaxial with and of the same diameter as said cylindrical chamber, a plunger operating in said cylindrical chamber, at least the free end portion of said plunger making a close running fit in said chamber, means for reciprocating said plunger to and from a position where its free end surface is flush with the molding surface of said section and a position where said free end surface is remote from said opening, retractable means closing the end of said chamber adjacent said opening, when said plunger is in a retracted position and means for introducing a measured charge of molding material to said chamber comprising an elongated housing having offset entrance and discharge openings, a volumetrically adjustable charge receiving member reciprocable in said housing between said entrance opening and said discharge opening, means to supply molding material to said charge receiving member when the latter is aligned with said entrance opening to be discharged through said discharge opening when said receiving member is reciprocated into alignment with the discharge opening, said discharge opening communicating with the chamber between said closing means and said plunger in its retracted position to discharge the molding material carried by said receiving member in the chamber to be compressed between said closing means and said plunger upon a predetermined advance of said plunger and to be transferred to said molding cavity through said first-named opening upon retraction of the closing means and the completion of the advance of the plunger to said first-named position.

4. Apparatus for molding articles from a thermosetting molding material which comprises a platen press, mold members releasably carried by the press platens, means to heat the mold members, a material pre-conditioning cylinder mounted on one of said press platens and opening therethrough and to the inner surface of the mold member carried thereby through an opening in said mold member coaxial and commensurate with the base of the pre-conditioning cylinder, means to heat the pre-conditioning cylinder, a plunger mounted for reciprocation in said pre-conditioning cylinder including said opening, a fluid pressure cylinder having a piston connected to the plunger for reciprocating the plunger, a gate for closing the end of the pre-conditioning cylinder adjacent said opening, means for moving the gate to and from closed and open position, means for introducing a measured charge of molding material in powder form into the pre-conditioning cylinder when said gate is closed and the plunger in retracted position, means for actuating the pressure cylinder to compress the charge between the gate and the plunger, the free end portion, at least, of the plunger making a sufficiently close sliding fit in the pre-conditioning cylinder to substantially prevent flow of the molding material therearound while permitting escape of air and reaction gases, means to control the temperature of the plunger, means to actuate the gate moving means to open the gate, and means to immediately thereafter actuate the pressure cylinder to advance the plunger to transfer the charge in its entirety from the pre-conditioning cylinder to the mold.

5. Apparatus as in claim 4 including means to retard the plunger during the terminal portion of its charge transferring movement.

6. Apparatus as in claim 4, the pressure cylinder and the pre-conditioning cylinder being positioned side by side in parallel relation, the piston of the pressure cylinder being connected to the plunger of the pre-conditioning cylinder by a yoke.

7. Apparatus as in claim 4, the plunger when in retracted position being free of the pre-conditioning cylinder, and means, operative when the plunger is so positioned, to remove any adhering molding material therefrom.

8. Apparatus for molding articles from a thermosetting molding material which comprises mold members movable toward and away from each other to close and open the mold, one of said mold members being provided with an entrance opening, a chamber communicating with said opening and conforming in cross section thereto, a plunger mounted for reciprocation in said chamber and opening, a gate to close the chamber adjacent said mold opening, means to introduce a measured charge of molding material into said chamber in advance of said plunger, means to advance the plunger to compress the charge between the plunger and said gate when the latter is closed, means to open said gate to permit the advance of said plunger into said opening to completely transfer the charge from the chamber into the mold, the working face of said plunger providing a mold closure for said opening, and means to control the temperature of the working face of said plunger.

References Cited in the file of this patent

UNITED STATES PATENTS

| | | |
|---|---|---|
| 2,398,318 | MacMillin | June 12, 1943 |
| 2,442,368 | Maynard | May 4, 1945 |
| 2,899,710 | Hendry | Aug. 18, 1959 |
| 2,912,719 | Gilmore et al. | Nov. 17, 1959 |

UNITED STATES PATENT OFFICE
CERTIFICATE OF CORRECTION

Patent No. 3,137,038            June 16, 1964

Charles Edgar Maynard

It is hereby certified that error appears in the above numbered patent requiring correction and that the said Letters Patent should read as corrected below.

Column 5, line 58, for "power" read -- powder --; column 11, line 7, for "switching position" read -- switch actuating position --; line 65, for "not" read -- no --; column 13, line 39, after "possible," insert -- in --.

Signed and sealed this 9th day of February 1965.

(SEAL)
Attest:

ERNEST W. SWIDER            EDWARD J. BRENNER
Attesting Officer             Commissioner of Patents